(12) United States Patent
Döring

(10) Patent No.: US 9,540,703 B2
(45) Date of Patent: *Jan. 10, 2017

(54) METHOD FOR INCREASING THE YIELD IN LACTOSE PRODUCTION (II)

(71) Applicant: DMK Deutsches Milchkontor GmbH, Bremen (DE)

(72) Inventor: Sven-Rainer Döring, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 154 days.

This patent is subject to a terminal disclaimer.

(21) Appl. No.: 14/101,808

(22) Filed: Dec. 10, 2013

(65) Prior Publication Data

US 2015/0159231 A1    Jun. 11, 2015

(30) Foreign Application Priority Data

Jan. 22, 2013 (EP) ..................... 13152214

(51) Int. Cl.
*C13K 5/00* (2006.01)

(52) U.S. Cl.
CPC ..................... *C13K 5/00* (2013.01)

(58) Field of Classification Search
CPC ....................................................... C13K 5/00
See application file for complete search history.

(56) References Cited

U.S. PATENT DOCUMENTS

| 2,197,804 A * | 4/1940 | Lavett | A23C 1/03 127/31 |
| 2004/0132989 A1 * | 7/2004 | Lifran | A23L 2/52 536/123.13 |
| 2006/0128953 A1 * | 6/2006 | Shi | B01D 9/0013 536/123.13 |

FOREIGN PATENT DOCUMENTS

| EP | 52541 | | 5/1982 |
| GB | 1575089 | * | 9/1980 |
| WO | 2012/047122 | | 4/2012 |

OTHER PUBLICATIONS

The Co-Crystallisation of Sugars by the Supersaturation Process Peter Geary—Doctural Thesis—University of Hull Sep. 2008, pp. 1-327.*
The Manufacture of Lactose Stephan Kellam The Lactose Company pp. 1-7, downloaded May 18, 2016.*
Wong et al: "Designing a lactose crystallization process based on dynamic metastable limit," Journal of food Engineering 111 (2012), pp. 642-654.

* cited by examiner

*Primary Examiner* — Melvin C Mayes
*Assistant Examiner* — Douglas B Call
(74) *Attorney, Agent, or Firm* — Dilworth & Barrese, LLP

(57) ABSTRACT

A method for improving the yield of the production of crystalline alpha-lactose is suggested, wherein (a) an aqueous lactose solution is gradually cooled down to about 10° C.,
(b) a first amount of precipitated alpha-lactose crystals is separated from the mother liquor,
(c) an amount of a carbohydrate compound is added to the mother liquor such that the solubility product of the lactose is exceeded at the given temperature,
(d) a second amount of precipitated alpha-lactose crystals is separated from the mother liquor, and
(e) both amounts of alpha-lactose crystals are combined.

9 Claims, No Drawings

METHOD FOR INCREASING THE YIELD IN LACTOSE PRODUCTION (II)

FIELD OF THE INVENTION

The invention is in the field of dairy processing and relates to an improved method of lactose production.

PRIOR ART

Lactose belongs to the group of disaccharides and consists of the two molecules D-galactose and D-glucose, which are linked together by a β-1,4-glycosidic bond.

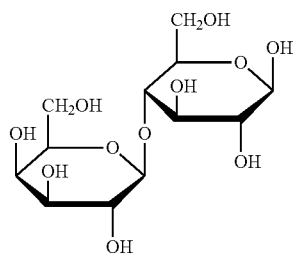

Lactose is a crystalline, colourless substance with a sweet taste; its sweetness is—depending on its concentration—between 25 and 60% that of the sweetness of saccharose. Lactose is a significant milk constituent and possesses a variety of nutriphysiological advantages. For example, it serves as a source of energy for the human metabolism, supports the resorption of calcium, hinders the development of putrefactive bacteria in the intestine and has a laxative effect when taken in larger doses. In food technology it is predominantly used for the production of lactic acid and as a texturizer for frozen foods. As it adds a creamy taste to foods, it is a widely used additive.

Lactose is a by-product from the production of protein powders. In doing so, proteins are conventionally removed from whey by ultrafiltration and are subsequently subjected to spray-drying.

International patent application WO 2002 050089 A1 (Food Science Australia A) describes a method for the production of lactose which is commonly used today. In a first process step, the permeate obtained by ultrafiltration of the whey is concentrated by reverse osmosis (RO) or nanofiltration (NF). Subsequently, the concentrate thus obtained is demineralised in two steps, i.e., it is firstly reacted with an alkaline earth salt, usually an aqueous solution of calcium chloride, whereby the minerals are precipitated as calcium phosphate. During the second precipitation step the solubility of the calcium salts is further decreased by adding lower alcohols and another phosphate is precipitated. The separation of the salts is then carried out by means of suitable filtration devices such as, for example, membranes, separators or the like. The purified lactose solution is then subjected to vacuum distillation and adjusted to a solids content of about 65% by weight.

U.S. Pat. No. 4,202,909 also describes a method for obtaining lactose, wherein whey is firstly subjected to ultrafiltration, the resulting permeate is subjected to demineralisation, then the permeate is concentrated, followed by the separation of lactose from the mother liquor. In particular it describes that the mother liquor may be demineralised and processed again to obtain a further amount of lactose. GB 1575089 B is of a similar contents, with example 1 describing a method for obtaining lactose, wherein, in a first step, whey is subjected to ultrafiltration, the UF permeate is subjected to demineralisation, the permeate is concentrated and lactose is then separated from the mother liquor.

It is conventional according to the methods of the prior art that the mother liquor, which contains about 90% by weight lactose in the dry matter, is introduced into the crystallisation tank following the condenser. Said tank is heated for the introduction process to keep the lactose in solution. Pure beta-lactose is present above a temperature of 93.5° C. During the cooling process it is quantitatively transformed to alpha lactose. However, this is not a clear-cut phase transition, because, firstly, a metastable phase is passed through, from which alpha lactose crystals separate. After further cooling, this is usually followed by the saturation curve allowing the crystals enough time for growth.

After the start of the crystallisation process the temperature is reduced to between 30 and 40° C., the liquor is allowed to sit for a period of 1 to 3 h at this temperature and is then further cooled down to 10° C. The complete cooling time is about 20 h.

It is problematic that said cooling process repeatedly involves phases of metastable condition, in which new crystal nuclei may again form, which, however, have little time for growth and thus remain very small. As the newly formed tiny crystals with a diameter of less than 80 μm are not collected during the separation of alpha lactose crystals, which is carried out in a decanter, about 17% of the lactose is lost.

In addition, stirring in the decanter causes crystals to break, in the process of which material is formed that cannot be separated due to its low particle diameter. Another 20% of the lactose is lost this way, eventually resulting in a lactose content of the mother liquor of between 35 and 40% which needs to be processed with a high effort such that an acceptable yield—considering the overall analysis of the process—may be obtained.

It is obvious that any improvement of the process that my lead to a reduction of the residual amount of lactose in the mother liquor would have a considerable impact on the economy of the process. It has thus been the object of the present invention to improve existing methods of lactose production to this effect and to restrict the residual amount in alpha lactose to a maximum of 20% by weight, which is lost together with the mother liquor after crystallisation.

DESCRIPTION OF THE INVENTION

The subject matter of the invention is a first method for improving the yield of the production of crystalline alpha-lactose, wherein (a1) an aqueous lactose solution is gradually cooled down to about 10° C., (a2) a first amount of precipitated alpha-lactose crystals is separated from the mother liquor, (a3) an amount of a carbohydrate compound is added to the mother liquor such that the solubility product of the lactose is exceeded at the given temperature, (a4) a second amount of precipitated alpha-lactose crystals is separated from the mother liquor and (a5) both amounts of alpha-lactose crystals are combined.

Usually, the mother liquor obtained during the separation of the lactose crystals still contains from 30 to 35% by weight lactose. By adding up to 5% by weight of a sugar, particularly glucose, the solubility product of lactose may be shifted such that only between about 15 and 17% by weight lactose remains in the mother liquor.

The invention also comprises an alternative, second, method for improving the yield of the production of crystalline alpha-lactose, wherein
(b1) An amount of a carbohydrate compound is added to an aqueous lactose solution such that the solubility product of the amount of lactose which is still held in solution is exceeded,
(b2) the lactose solution is gradually cooled down to about 10° C.,
(b3) and the amount of precipitated alpha-lactose crystals is separated from the mother liquor.

In this form of embodiment, which employs the same inventive idea, the carbohydrates are directly added to the mother liquor. In doing so, it is avoided that the cooling and separation processes are passed through a second time, however, in comparison with the first process embodiment the mother liquor obtained has a slightly higher residual content of lactose in the range of from 20 to 25% by weight.

The carbohydrates are lost during this process; however, the higher amount of valuable lactose more than replaces this loss of value. In addition, it is also possible to employ a cheaper source of sugar such as, for example, beet sugar molasses, which further improves the profitability of the method.

Another subject matter of the invention thus comprises a method for the production of crystalline alpha-lactose, wherein
(i) whey is subjected to a separation process in which a protein-rich and a lactose-rich fraction is obtained,
(ii) the lactose-rich fraction is subjected to demineralisation—optionally, after its concentration—in which slowly soluble salts are precipitated,
(ii) the demineralised residue is cooled down, optionally after further concentration, until lactose precipitates in crystalline form,
characterized in that
(a1) a first amount of precipitated alpha-lactose crystals are separated from the mother liquor,
(a2) an amount of a carbohydrate compound is added to the mother liquor such that the solubility product of the lactose is exceeded at the given temperature,
(a3) a second amount of precipitated alpha-lactose crystals is separated from the mother liquor, and
(a4) both amounts of alpha-lactose crystals are combined, or
(b1) an amount of a carbohydrate compound is added to the aqueous lactose solution such that the solubility product of the amount of lactose held in solution is exceeded,
(b2) the lactose solution is gradually cooled down to about 10° C.,
(b3) and the amount of precipitated alpha-lactose crystals is separated from the mother liquor.

Lactose Solutions

Lactose solutions, which in the meaning of the method of the invention are suitable as starting materials for obtaining alpha-lactose crystals, are usually obtained on the basis of whey. To this end, whey is firstly separated into a protein-rich and a lactose-rich fraction. The preferred separation in this case is ultrafiltration (UF), in which the UF retentate is further processed to obtain proteins, and the UF permeate is used to obtain lactose. Typically, the UF retentate contains a dry matter of about 20% by weight, of which about 2% by weight is lactose, while the ash content is about 1% by weight. In contrast, the UF permeate which is further processed to produce lactose has a content of dry matter of from about 4.5 to 5.5% by weight, wherein the lactose content is from about 4.1 to 4.6 and the ash content is from about 0.3 to 0.5.

An optional, but generally preferred step is concentrating the UF permeate by adjusting a dry matter content of from about 10 to 30% by weight—corresponding to 10 to 30° Brix-. This is preferably carried out by reverse osmosis (RO) or nanofiltration (NF).

The UF permeate shows—if applicable, after concentrating—a mineral content in the order of from 1 to 2% by weight. To allow the solutions to reach the specification which is at below 0.3% by weight, they are firstly adjusted to a near neutral pH value in the range of from 6 to 8 by adding bases, and an amount of a solution of a water-soluble calcium salt is added to the minerals, which essentially are soluble phosphates, such that slowly soluble calcium salts are precipitated. To adjust the pH value and to precipitate NaOH, an aqueous preparation of calcium chloride and alkali hydroxide or calcium hydroxide is used. In principle, alkaline or earth alkaline bases such as, for example, —KOH may be used to adjust the pH value. The nature of the precipitating salt is uncritical per se, for example, barium salts may precipitate. However, the use of calcium salts has the advantage that the precipitating agent has a reasonable cost and the salts have a very low solubility product, i.e. precipitation is essentially complete. Also without adding precipitating agents, demineralisation is carried out in stirrer vats, in the process of which it has proven to be advantageous to adjust a temperature in the range of from about 50 to 90 and, preferably, of about 80° C. Precipitation time is typically between about 20 and 120 and, preferably, between about 30 and 45 min, whereby said indications are to be understood to merely serve as reference purposes, as lower temperatures require longer reaction times and vice versa. After precipitation the salts are separated, for example, in separators that exploit the greater specific weight of the precipitated particles. However, it is also possible to perform separation, for example, by means of membrane filters during another ultrafiltration process within the range of 5 to 150 kDa, preferably, 10 to 50 kDa.

At this point, the purified flow typically contains from 15 to 20, preferably, about 17.5% by weight lactose while the ash content has already been reduced to about 0.8. If desired or required, a second demineralisation step may follow in which an amount of lower alcohols, particularly ethanol, is added to the pre-purified flow to further reduce the solubility product of the calcium salts still contained. In doing so, another amount of salts may be precipitated, if so required, and separated as described above.

In a second optional, but also generally preferred step the demineralised lactose-rich stream is concentrated again after leaving the separators, whereby a solids content is adjusted which is essentially identical with the lactose content of about 50 to 70% by weight, corresponding to about 40 to 50° Brix. This is preferably performed by vacuum evaporation in which the product is evaporated to, preferably, about 65% by weight and, optionally, also alcohol from the demineralisation step is separated. The aqueous lactose solutions thus obtained may be introduced in the crystallisation step.

Carbohydrates

Carbohydrates that are particularly suitable for significantly reducing the solubility product of lactose are, particularly, mono and/or disaccharides, including both aldoses and ketoses. Typical examples include trioses such as, for example D- and L-glyceraldehyde or dihydroxyacetone;
tetroses such as, for example, D-erythrose or D-threose;

pentoses such as, for example, D-ribose, D- and L-xylulose;

hexoses such as, for example, D-glucose, D-mannose, D-gulose, D-idose, D-galactose, D-glucuronic acid, D-galacturonic acid, N-Acetyl-D-glucosamine, D-glucosamin, D-fructose, and L-rhamnose;

Glucose-based disaccharides such as, for example, cellobiose, gentiobiose, isomaltose, isomaltulose, lactulose, laminaribiose, maltose, maltulose, melibiose, neohesperidose, neotrehalose, nigerose, rutinose, sophorose, saccharose and trehalose.

Besides D-glucose, glucose-rich carbohydrate fractions are particularly preferred, as they are easily accessible and cost-efficient and lead to an acceptable reduction of the solubility product at the same time. For cost reasons and because of their easy availability, sugar beet syrup or corn starch syrup are particularly preferred for use.

The carbohydrates may be added to the lactose mother liquors in amounts of up to 5% by weight. Preferably, the added amount is from about 0.1 to 3 and, particularly, from about 1 to 2% by weight.

Process Flow

In the first step of the process, a lactose solution which is obtainable as described above and contains from about 60 to 95 and, preferably, from about 85 to 90% by weight lactose in dry matter, is pumped into a preheated crystallisation tank. This may be carried out continuously or batch-wise, depending on the devices used. The mother liquor may be adjusted to a temperature of above 93.5° C. before filling the tank to prevent the formation of alpha-lactose; however, this is not compulsory. It is also possible to use mother liquors in which the transformation of beta- into alpha-lactose has already begun. Within the tank, the solution is cooled down to between 62 and 67 and, preferably, between about 63 and 65° C. To this end, it is sufficient to allow the hot lactose solution to adapt to the starting temperature of the crystallisation tank, which is usually the case within a period of between 1 and 2 h.

Subsequently, the lactose solution is continuously cooled down at a rate of about 1 to 5° K/h to a temperature of between about 20 and 30 and, preferably, between about 23 and 26° C. and held there for a period of about 0.5 to 5 and, preferably, of about 1 to 3 h. Subsequently, the solution is now cooled down at a rate of from about 1 to 3° K/h to about 10° C. within a period of between about 1 and 3 h. With the onset of crystal separation, the solution is held at this temperature for a period of between about 12 and 15 h. A total time for carrying out the cooling process may be scheduled to be from about 18 to 24 and, preferably, about 20 h. Subsequently, the lactose crystals are separated from the mother liquor which is preferably carried out by means of decanters working according to the centrifugal principle. In principle, also any other component that allows a solid/liquid separation is suitable for this step. This includes, for example, separators on the basis of membranes. The lactose crystals still having mother liquor attached are gently dried in the following, particularly by means of belt dryers which have proven to be particularly suitable.

EXAMPLES

Comparison Example V1

Without the Addition of Carbohydrates

A first lactose mother liquor with a content of 89.5% by weight in the dry matter and a temperature of about 95° C. was placed into a pre-heated crystallisation tank, where it was cooled down to 65° C. at a rate of about 3° K/h within about 1 h and was held at this temperature for a period of no more than an hour before the solution was cooled down to 25° C. at a rate of about 3° K/h within about 1 h. The solution was held there at this temperature for a period of another 3 h and was then cooled down to 10° C. at a rate of 1° K/h within 1 h. With the onset of crystal separation, the solution was held at this temperature for a period of about 15 h, the precipitated alpha-lactose crystals were separated in a decanter and any attached moisture was removed on a belt dryer. The remaining second mother liquor had a residual content of 34.7% by weight lactose.

Examples 1 to 5

Addition of Between 0.1 and 5% by Weight Glucose

Between 0.1 and 5% by weight glucose were added to the second mother liquor of example V1. The solution was homogenized and then cooled down again as described above, and the additional amount of lactose crystals obtained by reducing the solubility product was separated. Table 1 represents the residual content of lactose in the third mother liquor such obtained depending on the amount of glucose added.

TABLE 1

Residual content of lactose in the last mother liquor (% by weight)

| Example | Amount of glucose | Residual amount of lactose in the mother liquor |
|---------|-------------------|------------------------------------------------|
| V1      | 0                 | 34.7                                           |
| 1       | 0.1               | 30.5                                           |
| 2       | 0.5               | 28.1                                           |
| 3       | 1.0               | 22.4                                           |
| 4       | 2.0               | 15.3                                           |
| 5       | 5.0               | 15.2                                           |

Examples 6 to 10

Addition of 2% by Weight Carbohydrates

2% by weight of different carbohydrates were added to the second mother liquor of example V1. The solution was homogenized and then cooled down again as described above, and the additional amount of lactose crystals obtained by reducing the solubility product was separated. Table 2 represents the residual content of lactose in the third mother liquor such obtained depending on the amount of glucose added.

TABLE 2

Residual content of lactose in the last mother liquor (% by weight)

| Example | Carbohydrate     | Residual amount of lactose in the mother liquor |
|---------|------------------|------------------------------------------------|
| V1      | None             | 34.7                                           |
| 6       | Glucose          | 15.3                                           |
| 7       | Saccharose       | 16.4                                           |
| 8       | Molasses         | 16.3                                           |
| 9       | Sugar beet syrup | 17.1                                           |
| 10      | Corn starch syrup| 17.5                                           |

Examples 10 to 15

Addition of Carbohydrates to the First Mother Liquor

2% by weight carbohydrates were added to a first lactose mother liquor with a content of 89.5% in the dry matter, homogenised and placed—at a temperature of about 95° C.—into a pre-heated crystallisation tank, where it was cooled down to 65° C. at a rate of about 3° K/h within about 1 h and was held at this temperature for a period of no more than an hour before the solution was cooled down to 25° C. at a rate of about 3° K/h within about 1 h. The solution was held there at this temperature for a period of another 3 h and was then cooled down to 10° C. at a rate of 1° K/h within 1 h. With the onset of crystal separation, the solution was held at this temperature for a period of about 15 h, the precipitated alpha-lactose crystals were separated in a decanter and any attached moisture was removed on a belt dryer. Table 3 represents the residual content of lactose in the second mother liquor such obtained depending on the type of carbohydrate.

TABLE 3

Residual content of lactose in the last mother liquor (% by weight)

| Example | Carbohydrate | Residual amount of lactose in the mother liquor |
|---|---|---|
| V1 | None | 34.7 |
| 11 | Glucose | 21.4 |
| 12 | Saccharose | 22.3 |
| 13 | Molasses | 23.7 |
| 14 | Sugar beet syrup | 23.5 |
| 15 | Corn starch syrup | 23.8 |

The invention claimed is:

1. A method for improving the yield of the production of crystalline alpha-lactose, comprising the steps of
   (a1) gradually cooling an aqueous lactose solution, as a mother liquor, to about 10° C.,
   (a2) separating a first amount of precipitated alpha-lactose crystals from the mother liquor,
   (a3) adding a carbohydrate compound, without adding additional lactose, to the mother liquor, in an amount of from 0.1 to 3% by weight of the mother liquor, such that the solubility product of the residual amount of lactose still held in solution is exceeded,
   (a4) separating a second amount of precipitated alpha-lactose crystals from the mother liquor and
   (a5) combining the first and second amounts of alpha-lactose crystals.

2. A method for improving the yield of the production of crystalline alpha lactose, comprising the steps of
   (b1) adding a carbohydrate compound, without adding additional lactose, to an aqueous lactose solution, as a mother liquor, said carbohydrate compound added in an amount of from 0.1 to 3% by weight of the mother liquor, such that the solubility product of the residual amount of lactose still held in solution is exceeded,
   (b2) gradually cooling the mother liquor to about 10° C., and
   (b3) separating the amount of precipitated alpha-lactose crystals from the mother liquor.

3. A method for the production of crystalline alpha-lactose, comprising the steps of
   (i) subjecting whey to a separation process in which a protein-rich and a lactose-rich fraction is obtained,
   (ii) subjecting the lactose-rich fraction of step (i) as lactose solution to demineralisation, optionally after concentration, to obtain a demineralised residue and precipitated salts,
   (iii) cooling the demineralised residue of step (ii), optionally after further concentration, to obtain an aqueous lactose solution as mother liquor and a first amount of precipitated lactose in crystalline form,
   (iv) adding an amount of a carbohydrate compound, without adding additional lactose, in an amount of from 0.1 to 3% by weight of the mother liquor, suitable to exceed the solubility product of the amount of lactose held in solution to the aqueous lactose solution as mother liquor of step (iii),
   (v) gradually cooling the lactose solution as mother liquor of step (iv) to about 10° C. to precipitate a second amount of alpha-lactose crystals, and
   (vi) separating the second amount of precipitated alpha-lactose crystals from the lactose solution as mother liquor of step (v).

4. The method of claim 3, wherein the carbohydrate compound is selected from the group consisting of monosaccharides and disaccharides.

5. The method of claim 3, wherein the carbohydrate compound is selected from the group consisting of trioses, tetroses, pentoses, hexoses, glucose-based disaccharides and mixtures thereof.

6. The method of claim 3, wherein the carbohydrate compound is selected from the group consisting of glucose and glucose-rich carbohydrate fractions.

7. The method of claim 6, wherein the glucose-rich carbohydrate fraction is selected from the group consisting of sugar beet syrup and corn starch syrup.

8. The method of claim 3, wherein the alpha-lactose crystals are separated by a decanter.

9. The method of claim 3, wherein the alpha-lactose crystals separated from the mother liquor are evaporated by a belt dryer.

* * * * *